United States Patent
Aiyama

(10) Patent No.: US 7,075,666 B1
(45) Date of Patent: Jul. 11, 2006

(54) IMAGE PROCESSING APPARATUS AND SYSTEM, IMAGE FORMATION APPARATUS, AND RECORDING MEDIUM THEREFOR

(75) Inventor: Kenji Aiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/203,513

(22) Filed: Dec. 1, 1998

(30) Foreign Application Priority Data

Dec. 2, 1997 (JP) .............................................. 9/331672

(51) Int. Cl.
*G06F 15/00* (2006.01)
*G06K 1/00* (2006.01)
*H04N 1/32* (2006.01)

(52) U.S. Cl. ........................ 358/1.13; 358/1.1; 358/400; 358/401; 358/405; 358/434; 358/296; 358/305; 358/1.15; 358/448; 358/442

(58) Field of Classification Search .................. 358/1.1, 358/400, 405, 401, 434, 296, 305, 1.15, 1.13, 358/448, 442, 444, 426.02, 438, 468, 402; 379/100.01
See application file for complete search history.

(56) References Cited

U.S. PATENT DOCUMENTS

| | | | | | |
|---|---|---|---|---|---|
| 5,117,258 | A | * | 5/1992 | Iwata | 358/1.1 |
| 5,383,129 | A | * | 1/1995 | Farrell | 358/1.1 |
| 5,459,584 | A | * | 10/1995 | Gordon et al. | 358/434 |
| 5,493,634 | A | * | 2/1996 | Bonk et al. | 358/1.1 |
| 5,600,573 | A | * | 2/1997 | Hendricks et al. | 725/109 |
| 5,715,301 | A | * | 2/1998 | Terasaki et al. | 358/434 |
| 5,774,652 | A | * | 6/1998 | Smith | 726/20 |
| 5,819,047 | A | * | 10/1998 | Bauer et al. | 709/229 |
| 5,870,718 | A | * | 2/1999 | Spector | 705/26 |
| 5,892,591 | A | * | 4/1999 | Anglin, Jr. et al. | 358/407 |
| 5,930,810 | A | * | 7/1999 | Farros et al. | 707/506 |
| 5,933,136 | A | * | 8/1999 | Brown | 715/741 |
| 5,974,401 | A | * | 10/1999 | Enomoto et al. | 705/40 |
| 6,018,581 | A | * | 1/2000 | Shona et al. | 380/46 |
| 6,025,931 | A | * | 2/2000 | Bloomfield | 358/402 |
| 6,038,595 | A | * | 3/2000 | Ortony | 709/218 |
| 6,046,824 | A | * | 4/2000 | Barak | 358/400 |
| 6,145,884 | A | * | 11/2000 | Petkovsek | 283/61 |
| 6,188,766 | B1 | * | 2/2001 | Kocher | 358/448 |
| 6,202,092 | B1 | * | 3/2001 | Takimoto | 709/225 |
| 6,275,667 | B1 | * | 8/2001 | Miyazaki | 358/474 |
| 6,678,826 | B1 | * | 1/2004 | Kelly et al. | 726/2 |
| 2001/0046282 | A1 | * | 11/2001 | Bailey | 379/93.25 |

FOREIGN PATENT DOCUMENTS

JP 9-190318 7/1997

* cited by examiner

*Primary Examiner*—Madeleine A V Nguyen
(74) *Attorney, Agent, or Firm*—Fitzpatrick, Cella, Harper & Scinto

(57) ABSTRACT

An image formation apparatus receives, from a host computer, job data including image-formation data and a procedure for predetermined processing, and a computer controls image formation (printing) in accordance with the received procedure. Thereby, the image formation apparatus communicates with an external unit in accordance with the procedure, and based on a result of the communication, printing can be controlled, and by changing the content of the procedure, a control procedure for image formation can flexibly be changed. This enables detailed control of outputting, such as the restriction of the use of a printer, and the restriction of the use a printer in accordance with a user or the content of a document to be output.

18 Claims, 6 Drawing Sheets

IMAGE PROCESSING APPARATUS AND SYSTEM, IMAGE FORMATION APPARATUS, AND RECORDING MEDIUM THEREFOR

BACKGROUND OF THE INVENTION

1. Field of the Invention

The present invention relates to image processing apparatuses and systems, image formation apparatuses, and recording media containing processing programs used in them. In particular, the present invention is adapted for an image processing system for image formation, in which computers and a printer are connected by a network so that the printer can be shared by users.

2. Description of the Related Art

A conventional image formation system that forms images on a medium such as paper by using computers and a printer which are connected by a network so that the printer can be shared by users is shown in FIG. 6. FIG. 6 shows a block diagram of the conventional image formation system. The conventional image formation system will be described below with reference to FIG. 6.

In FIG. 6, an image formation apparatus 1 includes a network interface 2 for communicating with an external printer server 13 via a network 11, a central processing unit (CPU) 3 for performing overall control of the image formation apparatus 1, an image memory 4 for storing image data for image formation, a printer 5 for forming images on paper, and an internal bus 10 for mutually connecting the network interface 2, the CPU 3, the image memory 4, and the printer 5 so that data are transferred.

A host computer 6 transmits job data such as operation commands to the image formation apparatus 1. The printer server 13 receives image-formation data transmitted from the host computer 6. The printer server 13 temporarily stores the received data in a data storage means (not shown), and transmits them to the image formation apparatus 1. The network 11 mutually connects the image-formation apparatus 1, the host computer 6, and the printer server 13 so that data are transferred.

A process for transmitting image-formation data generated by the host computer 6 to the image formation apparatus 1 via the printer server 13 in order to perform printing is described below.

The image-formation data generated by the host computer 6 are transmitted to the printer server 13 via the network 11 in accordance with a request from the user. The printer server 13 temporally stores the image-formation data in the internal data storage means (not shown), and holds them until the image formation apparatus 1 is enabled to perform printing.

When the image formation apparatus 1 is enabled to perform printing, the printer server 13 transfers the stored image-formation data to the image formation apparatus 1 via the network 11. The image formation apparatus 1 receives the image-formation data transmitted from the printer server 13 via the network interface 2, and interprets the image-formation data with the CPU 3 to generate image data in the image memory 4. When the image formation apparatus 1 finishes generating the image data, the printer 5 forms an image on a sheet, based on the image data generated in the image memory 4. This completes printing by the host computer 6 using the printer server 13.

The above-described, conventional image formation system has the following problems.

The printer 5 cannot be restricted in use in accordance with the type of a document to be output.

The printer server 13 cannot perform various types of printout control.

Since a program for fixed restriction of the use of the printer 5 is executed in the printer server 13, the restriction of use cannot flexibly be changed.

Since one printer server 13 is used to grasp the condition of the printer 5 when it is used, if the one printer 5 malfunctions, printout and the condition of the printer 5 cannot be grasped.

SUMMARY OF THE INVENTION

Accordingly, in order that all or at least one of the foregoing problems may be solved, it is an object of the present invention to restrict the use of a printer in accordance with the content of a document to be output.

It is another object of the present invention to perform various types of print control.

It is a further object of the present invention to perform various types of detailed print control, such as restricting the use of a printer, and restricting the use of a printer in accordance with the content of a document to be output, regardless of a mode of using one printer server to grasp the condition of the printer when it is used, and to flexibly change the restriction of the use of the printer.

It is a still further object of the present invention to provide an image processing system and image formation apparatus having novel functions, and a machine-readable medium therefor.

Other objects and features of the present invention become apparent from the following embodiments and the description of the attached drawings.

To these ends, according to an aspect of the present invention, the foregoing objects have been achieved through provision of an image processing apparatus for performing image formation based on image-formation data, the image processing apparatus causing job data to include the image-formation data and a communication procedure for communicating with an external unit, and controlling the image formation in accordance with a result of communicating with the external unit, based on the procedure in the job data.

According to another aspect of the present invention, the foregoing objects have been achieved through provision of an image processing apparatus connected to an external unit via a network, the image processing apparatus comprising: communication means for communicating with the external unit; image processing means for generating image data from image-formation data; image output means for outputting to a medium images based on the image data; and control means for controlling the image processing means and the image output means; wherein the communication means receives job data including the image-formation data and a procedure for communicating with the external unit, and the control means executes the procedure in the job data to communicate with the external unit, whereby controlling image-output processing based on the image-formation data in accordance with a result of the communication with the external unit.

According to a further aspect of the present invention, the foregoing objects have been achieved through provision of a machine-readable recording medium for an image processing apparatus forming images based on image-formation data, the machine-readable recording medium containing a program for enabling a computer to have a function of: receiving from the exterior a job data including the image-formation data and a procedure for predetermined processing, and controlling image formation in accordance with the received procedure.

According to a still further aspect of the present invention, the foregoing objects have been achieved through provision of a machine-readable recording medium containing a program for enabling a computer, in an image processing apparatus forming images based on image-formation data, to have a function of causing a job data to include the image-formation data and a communication procedure for communicating with an external unit, and controlling the image formation in accordance with a result of communication with the external unit based on the communication procedure included in the job data.

DESCRIPTION OF THE PREFERRED EMBODIMENTS

The following embodiments of the present invention will be described below with reference to the attached drawings.
(First Embodiment)

An image formation system according to a first embodiment of the present invention is an application of the present invention to an image formation system including a history management unit for limiting the number of printouts available to each user of the image formation system, or to an image formation system including the history management unit and a charging management unit for charging each user for using in accordance with the number of printouts.

Figure 1:
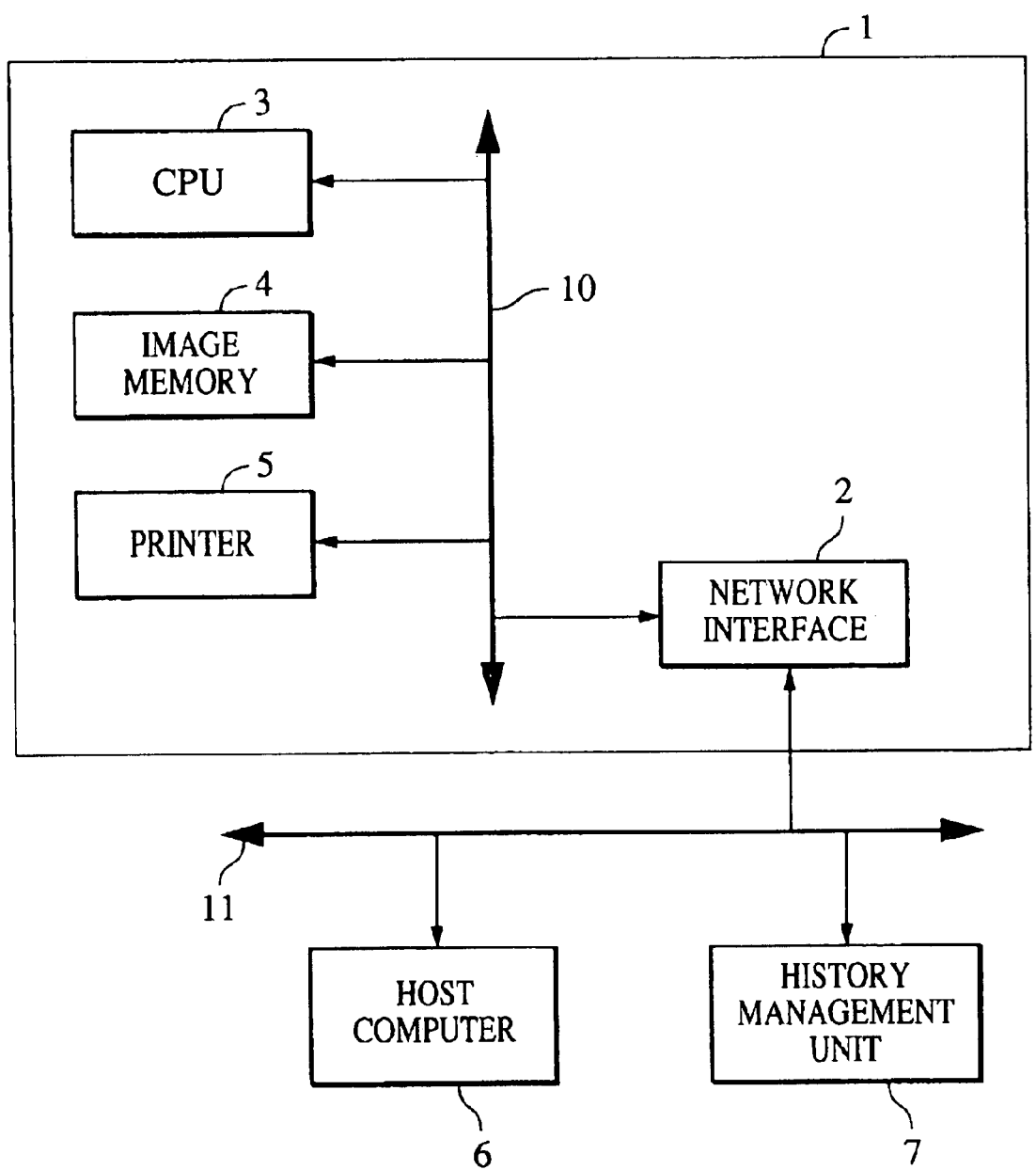
FIG. 1 is a block diagram showing an image formation system according to a first embodiment of the present invention.

FIG. 1 shows an optimal representation of the first embodiment. In FIG. 1, an image formation apparatus 1 includes a network interface 2 for communicating with an external host computer 6 and a history management unit 7 via a network 11, a CPU 3 for performing overall control of the image formation apparatus 1, an image memory 4 for holding image data for image formation, a printer 5 for forming images on paper, and an internal bus 10 for mutually connecting the network interface 2, the CPU 3, the image memory 4, and the printer 5 so as to transfer data.

The host computer 6 transmits job data (described below) to the image formation apparatus 1. The history management unit 7 records the utilizing history of the image formation apparatus 1 for each user having performed image formation, and includes a means for counting a total number of printouts for each user. The network 11 mutually connects the image formation apparatus 1, the host computer 6, and the history management unit 7 so as to transfer data.

In the first embodiment, the job data, which is used to perform a print job, includes image-formation data for forming an image to be printed, a communication program for performing communication between the image formation apparatus 1 and the history management unit 7, and utilizing information to be notified to the history management unit 7. The utilizing information includes user information for specifying a user, and a total number of printouts (a specified number of sheets to be printed) from the job data.

When the user instructs a print start from the host computer 6, the image-formation data are generated based on the data of a document to be printed. In addition, the user information for specifying a user, and the utilizing information including a total number of sheets of the document to be printed, are generated as utilizing information for the image formation apparatus 1. By adding to the image-formation data and the utilizing information a prestored communication program for communication between the image formation apparatus 1 and the history management unit 7, the job data is generated.

The generated job data is transmitted to the image formation apparatus 1 via the network 11. The transmitted job data is received via the network interface 2, and stored in a temporary memory (not shown) in the image formation apparatus 1. The CPU 3 reads the job data from the temporary memory (not shown), and divides it into image-formation data, a communication program, and utilizing information. The CPU 3 executes the communication program generated by the division.

Figure 2:
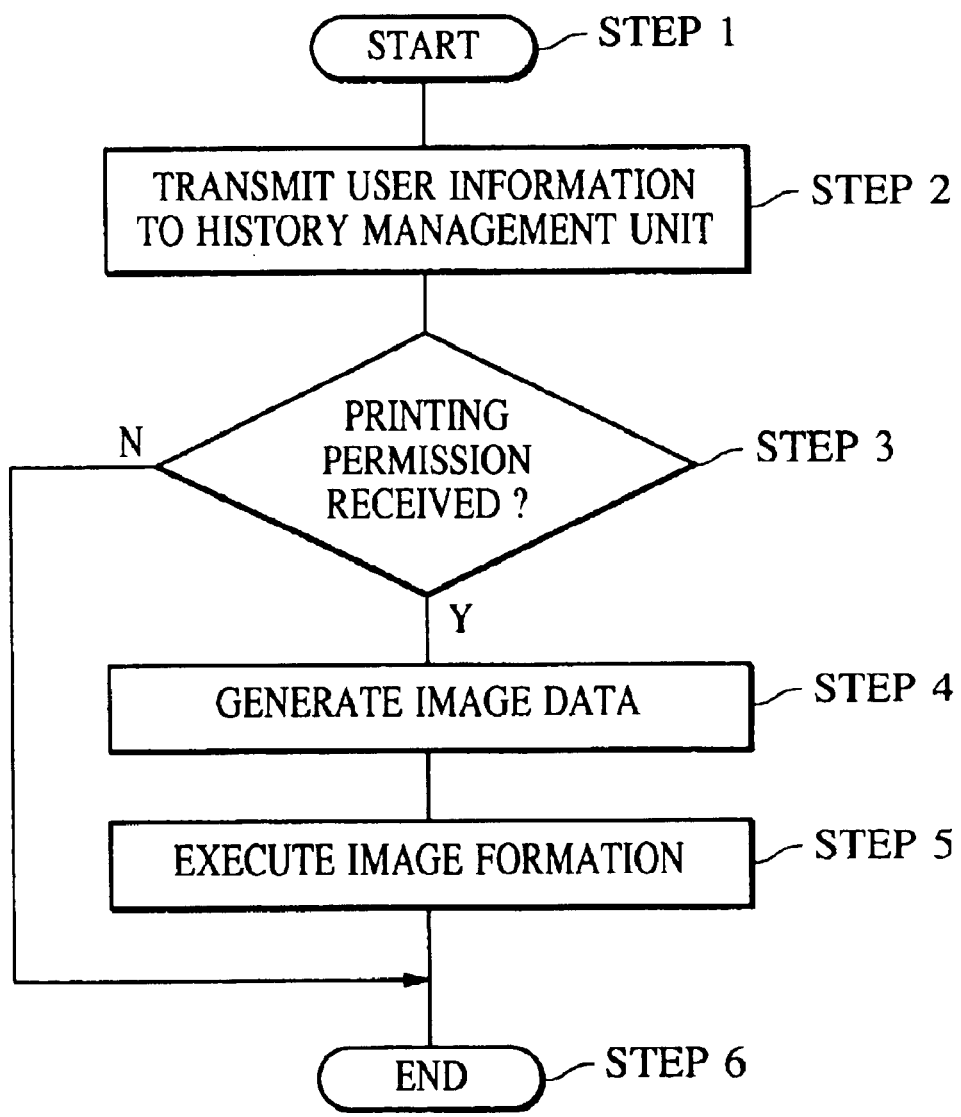
FIG. 2 is a flowchart showing a process performed by a program operating in an image formation apparatus in the image formation system according to the first embodiment.
Figure 3:
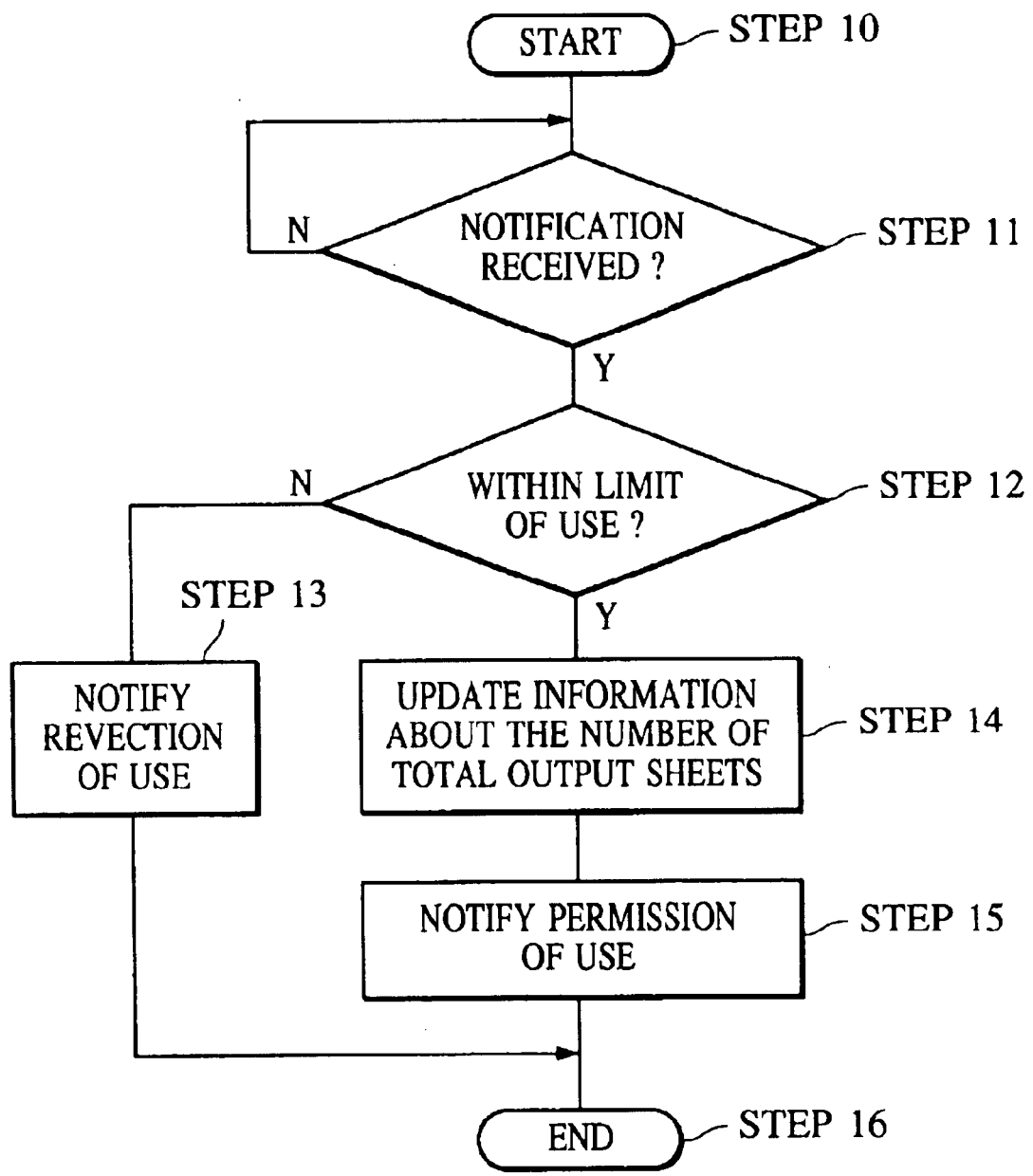
FIG. 3 is a flowchart showing a process performed by a program operating in a history management unit in the image formation system according to the first embodiment.

The operation of the communication program will be described with reference to FIGS. 2 and 3. FIG. 2 shows a flowchart of a program operating in the image formation apparatus 1. FIG. 3 shows the flow of internal processing in the history management unit 7. Initially, with reference to FIG. 2, the communication program for communication between the image formation apparatus 1 and the history management unit 7 is described.

In FIG. 2, when the communication program starts to be executed (step 1), the image formation apparatus 1 notifies the history management unit 7 of the utilizing information generated by the division, and awaits receiving a response to the notification (step 2). Subsequently, when the image formation apparatus 1 receives the response from the history management unit 7, it determines whether the response is a print permission. If the response is a print permission, the image formation apparatus 1 proceeds to step 4. If the response is not a print permission, the image formation apparatus 1 jumps to step 6 (step 3).

In step 4, based on the image-formation data generated by the division, image data is generated in the image memory 4. When the generating of the image data is complete, the generated image data is transferred to the printer 5, in which an image is formed on paper, based on the transferred image data (step 6). In steps 1 to 6, the image formation apparatus 1 performs a process from the job data reception to completion of printing.

Next, processing by the history management unit 7 is described with reference to FIG. 3. This processing corresponds to steps 2 to 3 in the flowchart (shown in FIG. 2) of the communication program operating in the image formation apparatus 1. In the first embodiment, a preset maximum number of outputable sheets, and a total number of printouts having been performed, are stored for each user in the history management unit 7.

Referring to FIG. 3, when the history management unit 7 starts to operate (step 10), it awaits being notified of the utilizing information by the image formation apparatus 1, and proceeds to step 12 when being notified (step 11). In step 12, the history management unit 7 accesses the user's utilizing information which is internally stored, and determines whether the total number of printouts is less than a preset maximum number of outputable sheets. If the total number is within the preset maximum number, the history management unit 7 proceeds to step 14. If the total number exceeds the preset maximum number, the history management unit 7 proceeds to step 13 (step 12).

In the case where the total number exceeds the preset maximum number, the history management unit 7 notifies the image formation apparatus 1 of rejection of use (step 13) before completing the processing (step 16). In the case where the total number is within the preset maximum number, the total number of sheets to be printed, which is included in the utilizing information notified in step 11 by the image formation apparatus 1, is added to the total number of printouts which is internally stored in the history management unit 7, whereby the-number-of-printouts information is updated (step 14). Next, the image formation apparatus 1 is notified of permission of use (step 15) before the processing is completed (step 16).

As described above, the host computer 6 instructs printing, and the image formation apparatus 1 communicates with the history management unit 7 by executing the communication program included in the job data transferred to the image formation apparatus 1 in accordance with the instruction, whereby it is determined whether the number of sheets to be printed by the user is more than the limit of outputable sheets, and the obtained result determines whether printing is executed. Thereby, for each user, the number of outputable sheets can be limited.

In the first embodiment, for each user having performed image formation, the utilization history of the image formation apparatus 1 is managed by the history management unit 7, and the communication program for utilizing restriction based on the utilization history is transmitted from the host computer 6 to the image formation apparatus 1. However, the utilization history may be managed by the image formation apparatus 1 itself. In such a case, not the communication program for communicating with the history management unit 7 but the utilizing restriction program for processing in the image formation apparatus 1 may be transmitted from the host computer 6 to the image formation apparatus 1.

The history management unit 7 may be one having a similar function of controlling permission/rejection of use, for example, a charging management unit for managing charging information for each user. Using the charging management unit can charge each user for the utilizing condition, based on total-number-of-printout information for each user, which is stored in the charging management unit.

The first embodiment provides the following characteristic effects.

A load on the network 11 can be reduced because the job data is transmitted on the network 11 only once.

High-speed printing can be performed because the job data is not transmitted via a printer server.

Since the communication program added to the job data is created by a manager of the host computer 6, it can easily be created as the manager hopes, which enables optimal charging processing in accordance with the group to which each user belongs and the purpose of outputting, and the restriction of printing. The communication program may be expressed in various languages, for example, a language called "Java" or the like.

An independent communication program can be added to each job data. Thus, an optimal communication program for each user can be utilized.

A printer sever is not used to grasp the utilizing condition of the printer 5. Thus, the utilizing condition or printing can be grasped regardless of a malfunction of the printer server.

(Second Embodiment)

A second embodiment of the present invention is the following image formation system in which a user pays a fixed charge for each time of printing. In the second embodiment, the user inputs information (e.g., an address number) for specifying a document server for various documents, and the document number of the desired document. In addition, the image formation system employs a method in which the user inputs a credit-card number so that a charge is paid by a credit-card company.

Figure 4:
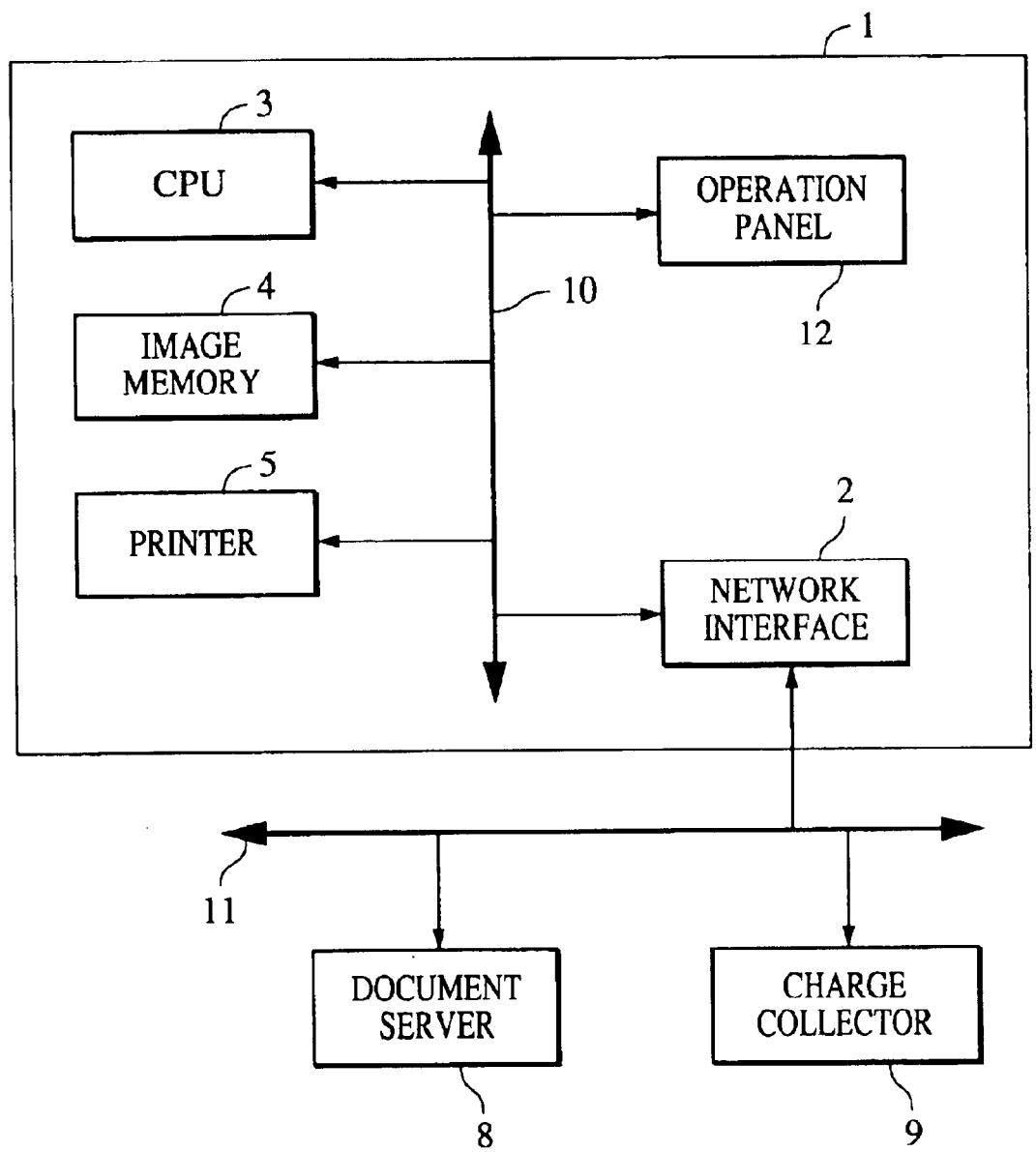
FIG. 4 is a block diagram showing an image formation system according to a second embodiment of the present invention.

FIG. 4 is a block diagram of an image formation system to which the second embodiment is applied. In FIG. 4, blocks denoted by reference numerals identical to those shown in FIG. 1 have the same functions. Accordingly, a detailed description of them will be omitted. An image formation apparatus 1 is provided with an operation panel 12 including a liquid-crystal display screen and a keyboard for allowing the user to input an address number, a document number, and a credit-card number. Document data are stored in a document server 8. A process for collecting a charge for printing is performed by a charge collector 9. There is at least one document server on a network 11, including a document server not shown in FIG. 4.

In the second embodiment, a plurality of document data is stored in the document server 8, with document numbers respectively assigned to the document data. The document data are job data including image-formation data based on which images are formed (e.g., data representing documents), and a communication program for communication between the image formation apparatus 1 and the charge collector 9.

Figure 5:
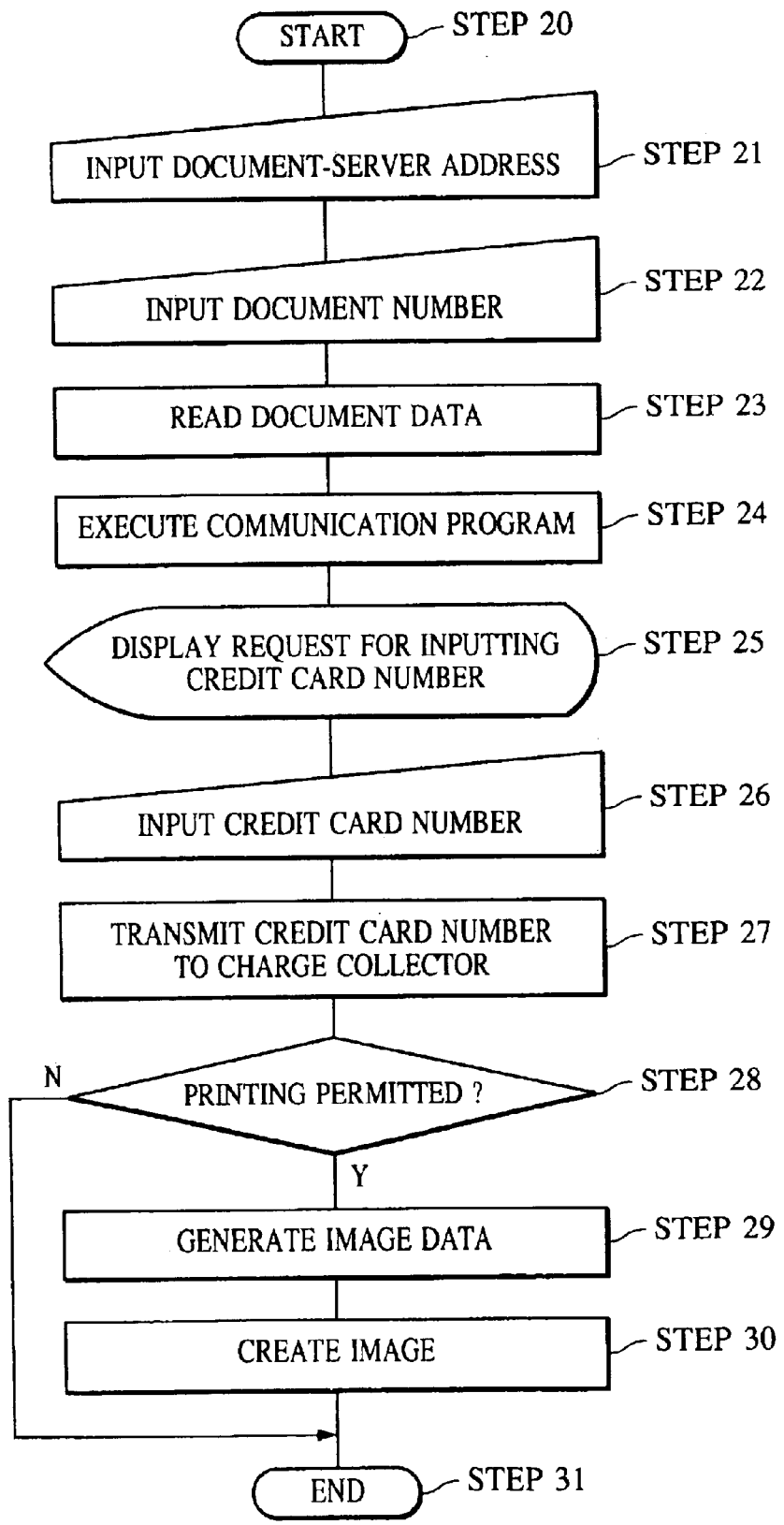
FIG. 5 is a flowchart showing a process performed by a program operating in an image formation apparatus in the image formation system according to the second embodiment.
Figure 6:
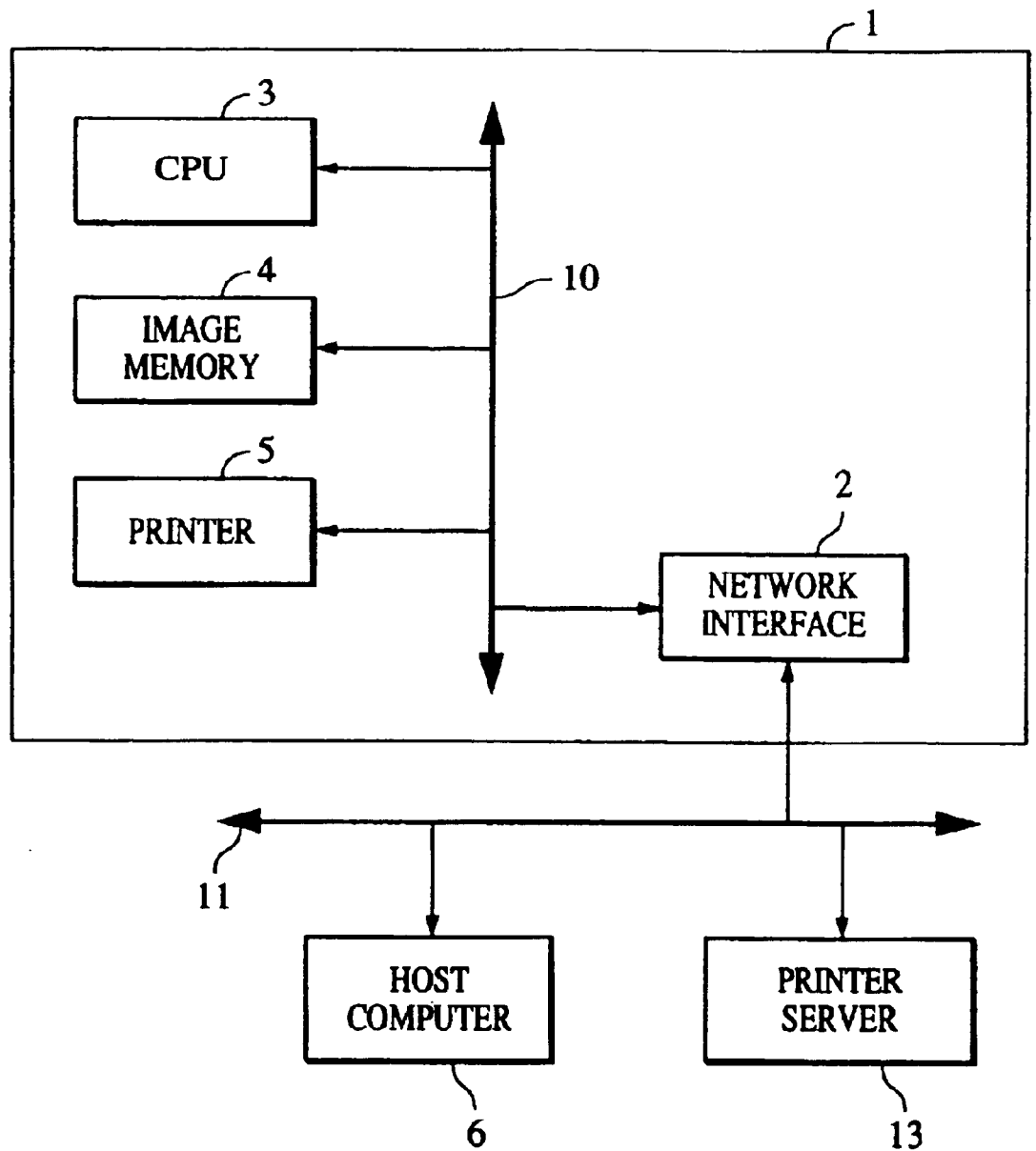
FIG. 6 is a block diagram showing a conventional image formation system.

FIG. 5 shows a flowchart of a program operating in the image formation apparatus 1 in the second embodiment. A process up to the execution of printing is described with reference to FIGS. 4 and 5.

When the image formation apparatus 1 starts to operate (step 20), a screen for requesting the user to input the address of a document server is displayed on the operation panel 12, and the user inputs the address of the desired document server (step 21). Here, the address of the document server 8 shown in FIG. 4 is input.

The user inputs a document number for selecting one document from documents stored in the document server 8 selected in step 21 (step 22). When the inputting ends, connection to the document server 8 via the network interface 2 and the network 11, based on the address of the document server 8 input in step 21, is performed, and a document corresponding to the document number input in step 22, which is stored in the document server 8 is read by the image formation apparatus 1 (step 23). From the read document data, a communication program is extracted and executed (step 24).

The executed communication program has the following process. Initially, the communication program displays, on the operation panel 12, a request for inputting a credit-card number for charging the user (step 25), and waits for the user to input a credit-card number from the operation panel 12 (step 26). When the credit-card number is input in step 26, it is transmitted to the charge collector 9 (step 27).

The charge collector 9 receives the credit-card number from the image formation apparatus 1, and determines whether it is valid. If it is valid, the charge collector 9 responds with a print permission. If it is not valid, the charge collector 9 responds with a print refusal. If a response to the transmission in step 27 is a print permission, the process proceeds to step 29. If a response to the transmission in step 27 is a print refusal, the process jumps to step 31 (step 28).

In step 29, from the document data read from the document server 8 in step 23, image-formation data is extracted and used to generate image data in the image memory 4. Based on the image data generated in the image memory 4, an image is formed on paper (step 30), and the process ends (step 31). As described above, processing from selection of the document server 8 and the document number to completion of printing is performed.

The charge collector 9 selects based on the received credit-card number the user having performed printing, and charges the user for the printing of the document, later. As described above, a document number is used to select a document stored in the document server 8, and the selected document data is read by the image formation apparatus 1 so that a communication program included in the document data is executed, whereby the inputting of the user's credit-card number and the transmission of the credit-card number to the charge collector 9 is executed to complete a process for charging the user having performed printing for printouts.

The document server 8, and the charge collector 9 may be changed in position if they are connected to the network 11. By way of example, wherever the document server 8 and the charge collector 9 exist in the world by means of the Internet, the above-described process for printing can be performed.

In the second embodiment, for charging the user for the printing of a document, the above-described system is formed. The purpose of the system is not limited thereto, but may be applied to the following purposes of: collecting, based on a credit-card number or the like, information about a user having performed printing; determining permission or refusal of printing in accordance with a group to which a user belong; and giving permission of printing to a particular user.

The second embodiment provides the following advantages.

The operation panel 12, in other words, an interactive means for communicating with the user, in the image formation apparatus 1, enables selecting and printing a document. Thus, a system for printing the document can be composed of only the image formation apparatus 1 and the network 11 which are connected to the document server 8 and the charge collector 9. This realizes low-cost document printing and a charge collecting system.

The communication program added to the document data is created by a manager of the document server 8. Accordingly, the communication program can easily be created as the manager hopes. For example, by changing a utilizing restriction program, utilizing restriction can flexibly be changed.

Since an independent communication program can be added to for each document data, an optimal communication program for each document can be used. Accordingly, utilizing restriction in accordance with the content of a document to be output can be performed.

As described above, the first and second embodiments have been separately described. However, a combination of the first and second embodiments may be used. In the case of the combination, by way of example, by counting a total number of printouts for each user and each document, the number of printable sheets can be limited for each user and each document. In addition, charging for use or charge collection is not limited to the above-described method. However, another method, for example, an electronic money system, may be used.

(Other Embodiments of the Present Invention)

As described above, in order that various devices may operate for enabling the above-described functions of the foregoing embodiments, the program code of software for enabling the functions of the foregoing embodiments is provided to an apparatus connected to the various devices or a computer in a system so that the various devices operate in accordance with a program stored in the system or the computer (CPU or MPU) of the apparatus, whereby the present invention is practiced. However, the present invention may be formed by hardware.

In such a case, the program code itself enables the functions of the foregoing embodiments. Thus, the program code, and a means for providing the program code to the computer, for example, a recording medium containing the program code, constitutes the,present invention. The types of the recording medium includes a floppy disk, a hard disk, an optical disk, a magneto-optical disk, a CD-ROM, a magnetic tape, a non-volatile memory card, and a ROM.

Not only in the case where the computer executes the provided program code to enable the functions of the foregoing embodiments, but also in the case where the program code cooperates with the operating system of the computer, or other application software, to enable the functions of the foregoing embodiments, the program code is included in the embodiments of the present invention.

Moreover, the present invention includes a case in which the provided program code is stored in a memory in an add-in board of the computer or an add-in unit connected to the computer, and based on instructions from the program code, a CPU or the like provided in the add-in board or unit executes part or all of actual processing to enable the functions of the foregoing embodiments.

According to the foregoing embodiments, by causing job data to include image-formation data and a communication procedure for communicating with an external unit, and controlling image formation in accordance with a result of communication with the external unit based on the communication procedure included in the job data, by way of example, communication with various external units in accordance with the communication procedure can be performed so that a result of the communication controls printing. In addition, by changing the content of a supplied processing procedure, a control procedure for image formation can flexibly changed.

The above-described construction enables communication with another external unit as to print-related information and user information.

By way of example, in the case where a communication procedure for communicating with a charging management unit for managing the charging of each user for the utilizing condition of the image formation apparatus is supplied, an external unit can grasp the utilizing condition of the image formation apparatus for each user having performed image formation.

In the case where a procedure for restricting the use of the image formation apparatus for each user is supplied, image formation can be restricted for each user, for example, restriction can be performed based on the number of formed images.

In the case where a communication procedure for charging for use each user for image formation is supplied, it can charge each user having performed image formation, and the restriction of image formation by a user can be performed on the condition that the user is charged.

In addition, with the communication procedure independently provided for each image, independent image formation for each image (e.g., a document or the like) to be formed can be controlled (e.g., control of printing).

Moreover, the present invention may be variously modified regardless of the type of the printer and the type of the network.

What is claimed is:

1. An image processing apparatus for performing image formation based on image-formation data, said image processing apparatus comprising:
    receiving means for receiving job data that includes the image-formation data and a communication program for communicating with an external unit; and
    control means for controlling the image formation in accordance with a result of the communication with the external unit based on the communication program in the job data,
    wherein the communication program comprises a restriction procedure for restricting use of the image processing apparatus for each user.

2. An image processing apparatus according to claim 1, wherein the communication program determines whether to allow a user, who requests to print, to print or not by querying an external information apparatus.

3. An image processing apparatus according to claim 1, wherein the communication program determines whether or not said image processing apparatus allows a user to print, by referring to the number of sheets of information the user already has printed and the number of sheets of information which can be printed by the user, stored in the external unit.

4. An image processing apparatus according to claim 3, wherein the communication program comprises a procedure for communicating with a charging management unit for collecting charging information for charging each user for the utilizing condition of said image processing apparatus.

5. An image processing apparatus according to claim 3, wherein the communication program comprises a procedure for communicating with an image-formation-history management unit for recording the history of the utilizing condition of said image processing apparatus for each user.

6. An image processing apparatus according to claim 1, wherein the restriction procedure restricts based on the number of formed images the use of said image processing apparatus.

7. An image processing apparatus according to claim 1, wherein the communication program is used to pay a value necessary for image formation.

8. An image processing apparatus according to claim 1, wherein the communication program is independent for each image to be formed.

9. An image processing apparatus according to claims 1, 2, 3, 4, 5, 6, 7 or 8, wherein the external unit comprises a computer.

10. An image processing apparatus connected to an external unit via a network, said image processing apparatus comprising:
    communication means for communicating with the external unit, said communication means being configured to receive job data that includes image-formation data and a communication program for communicating with the external unit;
    image processing means for generating image data from the image-formation data;
    image output means for outputting to a medium images based on the image data; and
    control means for controlling said image processing means and said image output means in accordance with a result of the communication with the external unit by executing the communication program in the job data,
    wherein the job data is not required to be transmitted via a print server, and
    the external unit comprises an image-formation-history management unit for recording the history of the utilizing condition of said image processing apparatus for each user, and for restricting the use of said image processing apparatus based on the number of formed images.

11. An image processing apparatus according to claim 10, wherein an apparatus for supplying the job data to said image processing apparatus is connected to the network.

12. An image processing apparatus according to claim 10, wherein the external unit comprises a charging management unit for collecting charging information for charging each user for the utilizing condition of said image processing apparatus.

13. An image processing apparatus according to claim 10, wherein the external unit comprises a charge collector for charging each user for a value necessary for image formation.

14. An image processing apparatus according to claim 10, wherein the job data is independent for each image to be formed.

15. A machine-readable recording medium containing a program for controlling an image processing apparatus forming images based on image-formation data, said program comprising:
    code for a reception step, of receiving job data including the image-formation data and a second program for performing predetermined procedures; and
    code for a control step, of controlling image formation in accordance with the received second program,
    wherein the job data is not required to be transmitted via a print server, and
    the received second program comprises a restriction procedure for restricting the use of the image processing apparatus.

16. A machine-readable recording medium containing a program controlling an image processing apparatus forming images based on image-formation data, said program comprising:
    code for an addition step, of adding to job data the image formation data and a communication program for communicating with an external unit; and
    code for a control step, of controlling the image formation in accordance with a result of the communication with the external unit based on the communication program added to the job data,
    wherein the job data is not required to be transmitted via a print server, and
    the communication program comprises a restriction procedure for restricting the use of the image processing apparatus.

17. An image processing method for controlling an image processing apparatus performing image formation based on image-formation data, said image processing method comprising:

an addition step, of adding to job data the image-formation data and a communication program for communicating with an external unit; and a control step, of controlling the image formation in accordance with a result of communicating with the external unit based on the communication program, wherein the communication program comprises a restriction procedure for restricting the use of the image processing apparatus.

18. An image processing method for controlling an image processing apparatus connected to an external unit via a network, said image processing method comprising:

a receiving step, of receiving job data that includes image-formation data and a communication program for communicating with the external unit;

a communication step, of communicating with the external unit;

an image processing step, of generating image data from the image-formation data;

an image output step, of outputting to a medium images based on the image data; and a control step, of controlling said image processing step and said image output step in accordance with a result of the communication with the external unit by executing the communication program in the job data, wherein said job data is not required to be transmitted via a print server, and the external unit comprises an image-formation-history management unit for recording the history of the utilizing condition of the image processing apparatus for each user, and for restricting the use of the image processing apparatus based on the number of formed images.

* * * * *

UNITED STATES PATENT AND TRADEMARK OFFICE
CERTIFICATE OF CORRECTION

| | | |
|---|---|---|
| PATENT NO. | : 7,075,666 B1 | Page 1 of 1 |
| APPLICATION NO. | : 09/203513 | |
| DATED | : July 11, 2006 | |
| INVENTOR(S) | : Kenji Aiyama | |

It is certified that error appears in the above-identified patent and that said Letters Patent is hereby corrected as shown below:

ON THE TITLE PAGE [30]:

Foreign Application Priority Data, "9/331672" should be --9-331672--.

Signed and Sealed this

Fifth Day of June, 2007

JON W. DUDAS
*Director of the United States Patent and Trademark Office*